C. K. WILL.
WATER CLOSET CONNECTION.
APPLICATION FILED MAR. 12, 1914.
1,177,912.
Patented Apr. 4, 1916.
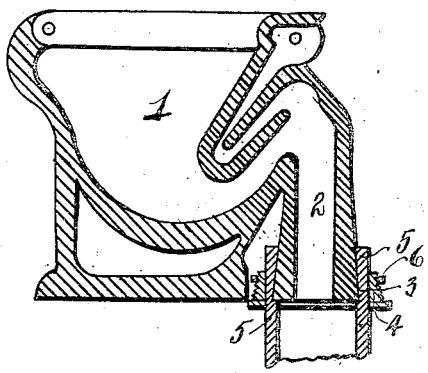
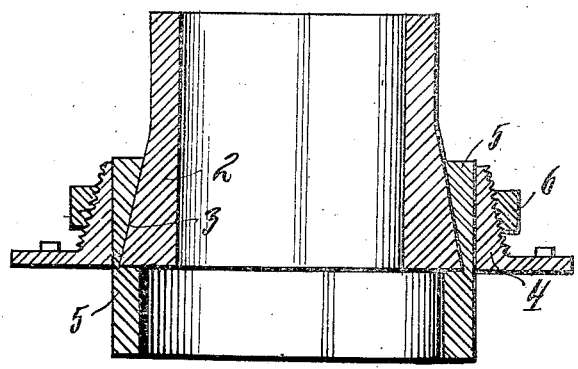
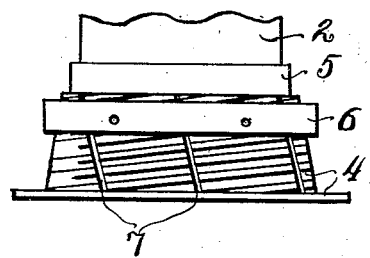
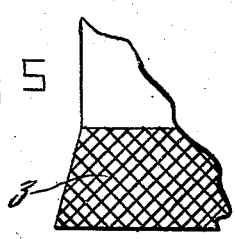
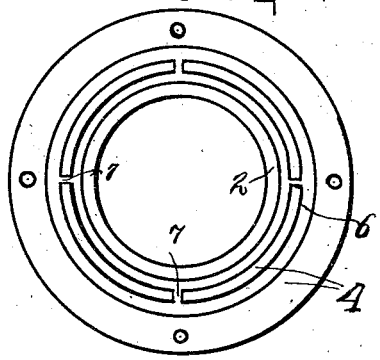
Witnesses:
John Thomas
M. L. Lefevre
Inventor:
Charles K. Will
E. Albert Singer
Attorney

UNITED STATES PATENT OFFICE.

CHARLES K. WILL, OF LANCASTER, PENNSYLVANIA.

WATER-CLOSET CONNECTION.

1,177,912.     Specification of Letters Patent.     Patented Apr. 4, 1916.

Application filed March 12, 1914. Serial No. 824,081.

*To all whom it may concern:*

Be it known that I, CHARLES K. WILL, a citizen of the United States, residing at Lancaster, in the county of Lancaster and State of Pennsylvania, have invented certain new and useful Improvements in Water-Closet Connections, of which the following is a specification, reference being had therein to the accompanying drawings.

This invention relates to an improved friction connection between the outlet of a water closet and the lead bend or connection, and has for its principal object the provision of a tapered split screw flange and a tapered threaded ring whereby the lead bend positioned around the outlet of the vitreous china or metal bowl provides an absolute tight friction connection.

A further object of the present invention may be said to reside in an outwardly tapered and scored end of the outlet. The purpose of this is to allow the lead bend or connection, when acted upon by the tapered split screw flange, to be pressed against the same, and thereby assuring a positive friction or tight connection.

A still further object of the present invention may be said to reside in providing the inner surface of the tapered split screw flange with a soft metal lining, said flange constituting the upper end of the outlet bend.

A still further object of the present invention may be said to reside in the provision of oblique cut-outs, which form the slots provided in the split screw flange.

Other objects of the invention relate to the providing of general details of construction and arrangement of parts as will hereinafter more fully appear.

The invention consists of the improvement hereinafter described, and finally claimed.

The nature, characteristic features and scope of the invention will be more fully understood from the following description taken in connection with the accompanying drawings forming part hereof, in which:—

Figure 1, is a view in central cross section of the bowl and lead bend connected by the split screw flange and tapered ring. Fig. 2, is an enlarged view of the connection shown in Fig. 1. Fig. 3, is a plan side view showing the tapered ring before the same is threaded completely on the split screw flange so as to assure a tight connection. Fig. 4, is a top plan view of Fig. 3. Fig. 5, is a fragmentary view of the tapered scored end of the vitreous china outlet of the water closet.

In fastening water closets in place, it has been customary to secure the lead bend to the floor by bending the ends of the bend on the floor and parallel thereto, and to place thereon the outlet of the bowl, and securing both to the floor by bolts or other means, this outlet being so constructed as to provide a seat for either a rubber or putty gasket, and by forcing the outlet upon the lead bend to form a water-tight connection.

The disadvantages of the old method are obvious in view of the fact that the rubber gasket or putty would decompose and crumble, thereby causing a leakage in the connection, or the oil contained within the putty would saturate the floor adjacent the connection, causing the impression that the connection leaked, with the result that the contractor installing the water closet had to remove the same to satisfy his customer that there was no leak; or in the event of a leak, inserted. This procedure added to the expense of installing a water closet, and at the same time did not provide a connection lasting the life of the metal and vitreous china parts.

In the present case it is only necessary to unscrew the tapered ring and lift the bowl with its outlet from the floor. The necessary repairs having been made, the outlet of the bowl is placed within the lead bend, and the ring is then rethreaded upon the tapered split screw flange without replacing any of the old parts, and providing the same tight friction connection as when the water closet was first installed.

In practising the invention, use is made of the bowl 1, provided with the usual outlet 2, having its outer end flared as at 3, and scored as shown in Fig. 5. Obviously should the outlet bend be situated in the wall, the outlet 2, would assume a position as shown in dotted lines in Fig. 1. A tapered split screw flange 4, adapted to be fastened to the floor of the room, and of a diameter greater than the lead bend 5, and having its outer surface threaded to engage a tapered threaded ring 6, is provided with oblique slots or cut-outs 7. The flange 4, being tapered, has a greater diameter at its base than at its top, and the tapered ring 6, when threaded upon the flange 4, causes the flange to be contracted and thereby frictionally holds the vitreous china outlet and the lead connection 5, together.

The object of having the outer circumference of the outlet flared and scored at its end is that the lead connection which is of comparatively soft metal will be forced against the scored portion of the outlet due to the pressure exerted by the tightening of the flange 4, and lie with its inner circumference embedded in the scored portion of the outlet. The oblique slots 7, allow the flange 4, to be contracted, and due to their formation prevent leakage; also tend to strengthen the flange, which would not be the case if the cut-outs were vertical. The flared ends of the outlet 2, prevent the connection from being broken at any time, and any strain upon the same would only serve to tighten the joint.

While the above description has relation to a connection for water closets, clearly the invention is not limited thereto, and may be used for any purpose where a friction connection may be utilized; for instance, union connection, and the like.

Having described and illustrated my invention, it is fully understood that I do not confine myself to the exact design, as slight changes may be made in the construction and combination of parts without departing from the spirit of the invention.

I claim:—

In a connection of the class described, the combination with a water-closet bowl, and a drain pipe, said bowl formed with a drainage outlet, said drainage outlet formed with a scored outer surface, a soft metallic end secured to the drain pipe and adapted to embrace the scored end of the drainage outlet, a flanged fitting secured to the floor and embracing said drainage outlet and said soft metallic end of the drain pipe, said fitting provided with external threads and slotted at its upper portion, and a tapered threaded ring adapted to be secured upon the flanged fitting for the purpose of pressing the same upon the soft metallic end of the drain pipe and embedding the same into the scored surface of the flanged end of the drainage outlet.

In testimony whereof I affix my signature in presence of two witnesses.

CHARLES K. WILL.

Witnesses:
WM. J. COULTER,
MABEL L. LEFEVIER.